United States Patent
Hammad et al.

(10) Patent No.: US 6,827,004 B2
(45) Date of Patent: Dec. 7, 2004

(54) DRIP COFFEE MAKER WITH HORIZONTAL SPRAY SHOWER HEAD

(75) Inventors: Jamal Hammad, Parkland, FL (US); Mahmoud Ismail, Pompano Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 10/150,906

(22) Filed: May 17, 2002

(65) Prior Publication Data

US 2003/0213370 A1 Nov. 20, 2003

(51) Int. Cl.[7] .............................................. A47J 31/00
(52) U.S. Cl. .............................. 99/315; 99/305; 99/307
(58) Field of Search .......................... 99/307, 306, 304, 99/305, 299, 300, 315

(56) References Cited

U.S. PATENT DOCUMENTS

| | | | |
|---|---|---|---|
| 1,474,858 A | * 11/1923 | Strohbach | 99/307 |
| 3,996,846 A | * 12/1976 | Hupf | 99/307 |
| 4,262,585 A | * 4/1981 | Leuschner et al. | 99/306 X |
| 4,634,838 A | * 1/1987 | Berz | 99/307 X |
| 5,964,141 A | * 10/1999 | Andrew et al. | 99/307 X |
| 5,964,143 A | 10/1999 | Driscoll et al. | |
| 6,564,975 B1 | * 5/2003 | Garman | 222/189.11 |

* cited by examiner

*Primary Examiner*—Reginald L. Alexander
(74) *Attorney, Agent, or Firm*—Lawrence J. Shurupoff

(57) ABSTRACT

A drip coffee maker having a horizontal spray of heated water into a brew basket. Much of the effect of gravity is removed and the spread of heated water may be increased. The horizontal spray shower head may be used to expose the top layer of coffee grinds in the brew basket to an equal amount of hot water within a few seconds of brewing start time. By immersing the coffee grinds in hot water at the same level, the coffee grinds are all subjected to the same water pressure. The water then filters down evenly over the coffee grinds in the brew basket. Thus, the coffee grinds within the brew basket are given maximum exposure to the heated water. This exposure allows more coffee to be extracted from fewer grinds, thus conserving coffee and avoiding overcooking of the grinds.

12 Claims, 4 Drawing Sheets

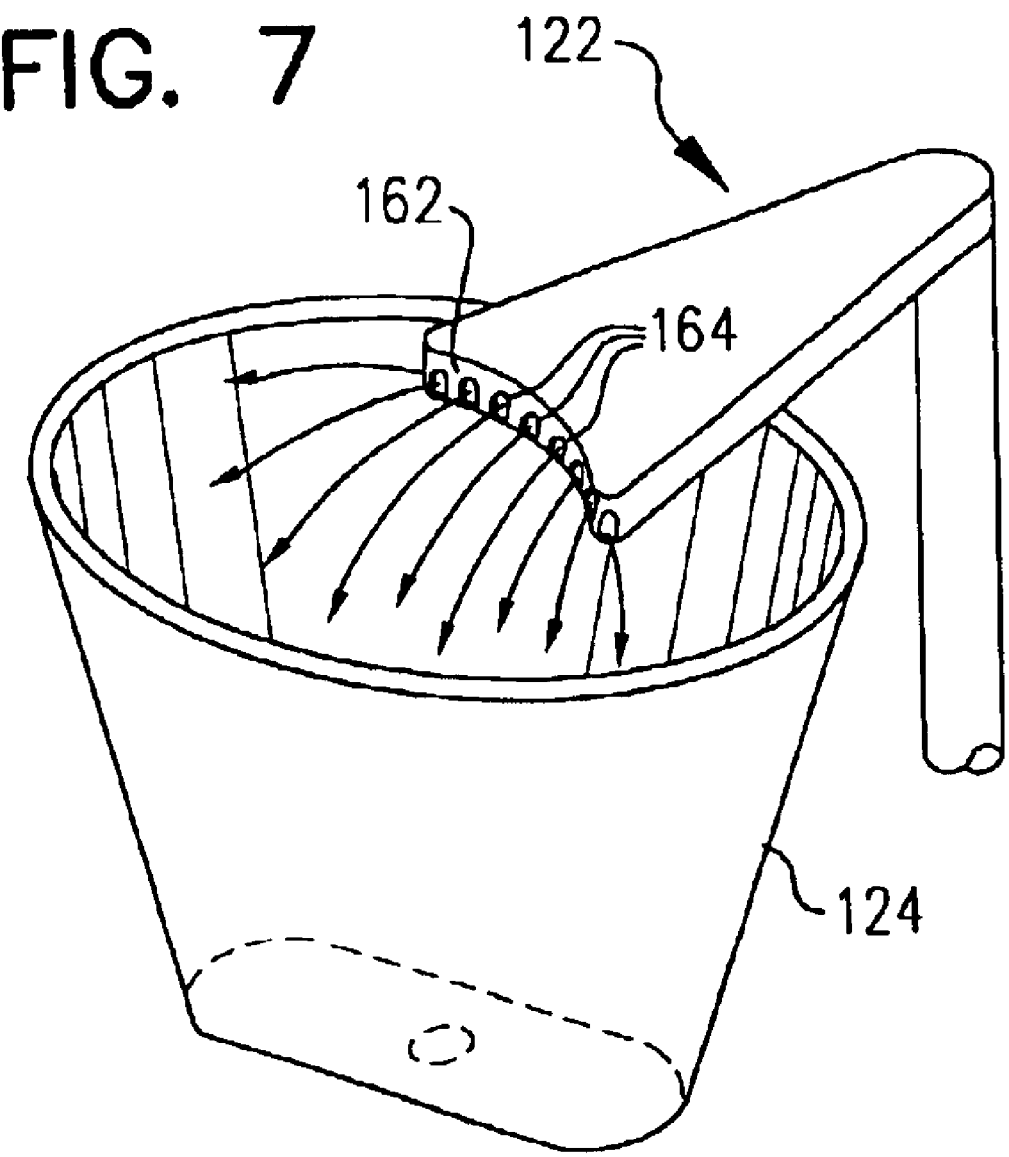

DRIP COFFEE MAKER WITH HORIZONTAL SPRAY SHOWER HEAD

TECHNICAL FIELD OF THE INVENTION

The present invention is generally relates to household appliances, and more particularly to coffee makers.

BACKGROUND OF THE INVENTION

Brewing coffee, also called a dripped coffee method, is the most common home coffee making method. To produce brewed coffee, hot, but not boiling, water drips through coffee grinds and the hot water extracts coffee particles from the grinds to form coffee. The coffee often drips into a coffee pot or a thermal carafe.

Many people use automatic drip coffee (ADC) makers to brew coffee. A typical design of an automatic drip coffee maker includes a water reservoir and a coffee brew basket. Water is poured into the reservoir and a user starts the brewing cycle, by either pressing an "on" button or setting the time for the brewing cycle and that time elapsing. Upon starting of the brewing cycle, waters flows from the reservoir through a heater of some kind, usually a heater tube. The heated water is routed to above the brew basket, and is allowed to drip through the brew basket, through the coffee grinds, and into a coffee pot or thermal carafe.

Although conventional automatic drip coffee makers work well for their intended purpose, one problem with their associated use is that not all coffee grinds in the brew basket are contacted with the hot water during the brewing process. Thus, the coffee grinds in the brew basket are not extracted evenly. Instead, often a cradle is formed in the coffee grinds directly below where the water drips into the brew basket. The cradle is created by the pressure exerted by the heated water. This pressure comes from two sources: the pressure generated by the steam in the water tube and the weight of the water being pulled down by gravity into the brewing basket.

Formation of the cradle in the coffee grinds causes the grinds in the cradle to be overexposed to the hot water, which leads to overextraction, or overcooking, of those grinds. This overextraction makes the grinds smaller in size which increases the size of the cradle and creates an easier path for the flow of water out of the brew basket. Thus, the cradle problem compounds after a cradle is starded. As a result, typically, after a period of initial brewing, water has a tendency to flow directly through the cradle without much extraction of the coffee grinds taking place.

One prior art method of minimizing the cradle effect is to use a vertical spray shower head in which water drips from a number of different locations that are spread over the brewing basket. Although this system works well to spread the hot water over the coffee grinds, often numerous cradles are formed at each spray location, resulting in overextraction at each spray location. Moreover, the vertical spray shower heads often cause pressure backflow to the heating system for a coffee maker, making the heating components, such as a thermostat, cycle often to maintain appropriate pressure in the coffee maker.

SUMMARY OF THE INVENTION

The present invention provides a drip coffee maker having a horizontal spray of heated water into a brew basket. To this end, in accordance with one embodiment of the present invention, the drip coffee maker includes a horizontal spray shower head that delivers water primarily in horizontal directions. The horizontal spray shower head is configured and arranged such that the horizontal spray of water lightly lands upon the grinds and is thoroughly spread over the grinds. Thus, the spray from the shower head does not move the coffee grinds to one side or the other in a brew basket. In addition, because the heated water travels to the brew basket in a horizontal direction, much of the effect of gravity is removed and the amount the heated water is spread may be increased.

The horizontal spray shower head may be used to expose the top layer of coffee grinds in the brew basket to an equal amount of hot water within a few seconds of brewing start time. The heated is continually added uniformly over the coffee grinds, and the water filters down evenly through the coffee grinds in the brew basket. By immersing the top layer of coffee grinds uniformly with the hot water, the coffee grinds at each location in the brew basket are all subjected to the same water pressure. In this manner, the horizontal spray shower head effectively eliminates the problem of a cradle being formed in the brew basket. In addition, the maximum number of coffee grinds within the brew basket are given exposure to the heated water. This exposure allows more coffee to be extracted from fewer grinds, thus conserving coffee and avoiding overcooking of the grinds.

In accordance with another aspect of the present invention, the horizontal spray shower head is configured such that water may flow freely through the shower head without backflow pressure. Without the backflow pressure, the heating components for the coffee maker do not have to work as hard to produce an optimal flow rate of heated water. Thus, a coffee maker utilizing the horizontal spray shower head is more efficient. Moreover, without backflow pressure, the flow rate is directly related to the heat output of heater for the coffee maker, and thus may be more effectively controlled. This feature permits a manufacturer to set the flow rate of the coffee maker with certainty by simply selecting the appropriate wattage for a heater.

Other advantages will become apparent from the following detailed description when taken in conjunction with the drawings, in which:

BRIEF DESCRIPTION OF THE DRAWINGS

FIG. 7 is a side perspective view of an alternative embodiment of a horizontal spray shower head for use with an oblong brew basket.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Figure 1:
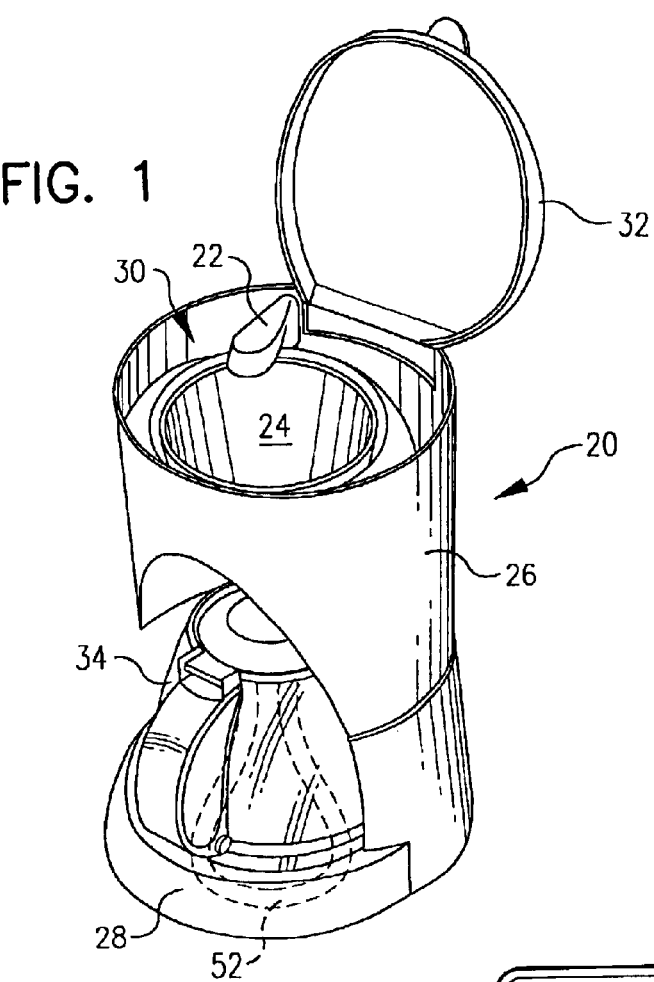
FIG. 1 is a side perspective view of a coffee maker incorporating a horizontal spray shower head in accordance with the present invention.

Referring now to the drawings, in which like reference numerals represent like parts throughout the several views, FIG. 1 shows a coffee maker 20 incorporating the present invention. Briefly described, the coffee maker 20 includes a horizontal spray shower head 22 that is configured and arranged to dispense heated water horizontally out over a brew basket 24 so that the water is evenly dispensed over the brew basket and so that the effect of gravity on the falling water is minimized.

The brew basket 24 shown in the drawings is a conventional brew basket having sloping sides. The brew basket 24 may, however, be shaped in a variety of different ways, and in general may be any shape that is configured to hold coffee grinds. However, because of the even spreading of the hot water by the horizontal spray shower head 22, a brew basket having a uniform thickness may work particularly well, as further described below.

The coffee maker 20 shown in the figures is of the automatic drip coffee (ADC) variety, but the present invention may be employed in any type of coffee maker that utilizes a drip method to make coffee. In the embodiment shown, the structure of the coffee maker 20 other than the horizontal spray shower head 22 is conventional. For example, the coffee maker includes a housing 26 that extends from a base 28 to the brew basket 24. A water reservoir 30 is located just behind the brew basket 24 and may be accessed by a reservoir lid 32. A decanter 34 is situated underneath the brew basket 24, and may alternatively be a thermal carafe or other coffee holding container. If a decanter 34 is used, a heating pad (not shown, but known in the art) may be located under the heating pad for keeping brewed coffee warm. While each of these features is conventional, the teachings of the present invention may be used with a multitude of different designs of drip coffee makers, which may or may not include some or all of these components.

During the brewing process, the horizontal spray shower head 22 is preferably arranged over the brew basket 24. In the embodiment shown, the horizontal spray shower head 22 is mounted so that it extends slightly over one edge of the brew basket 24. However, if desired, the horizontal spray shower head 22 may be mounted outside the perimeter of the brew basket, and may direct horizontal jets of water toward and into the brew basket. However, by mounting the horizontal spray shower head 22 so that the spray portion of the horizontal spray shower head is located above the brew basket 24, water that drips from the horizontal spray shower head may fall into the brew basket.

Figure 2:
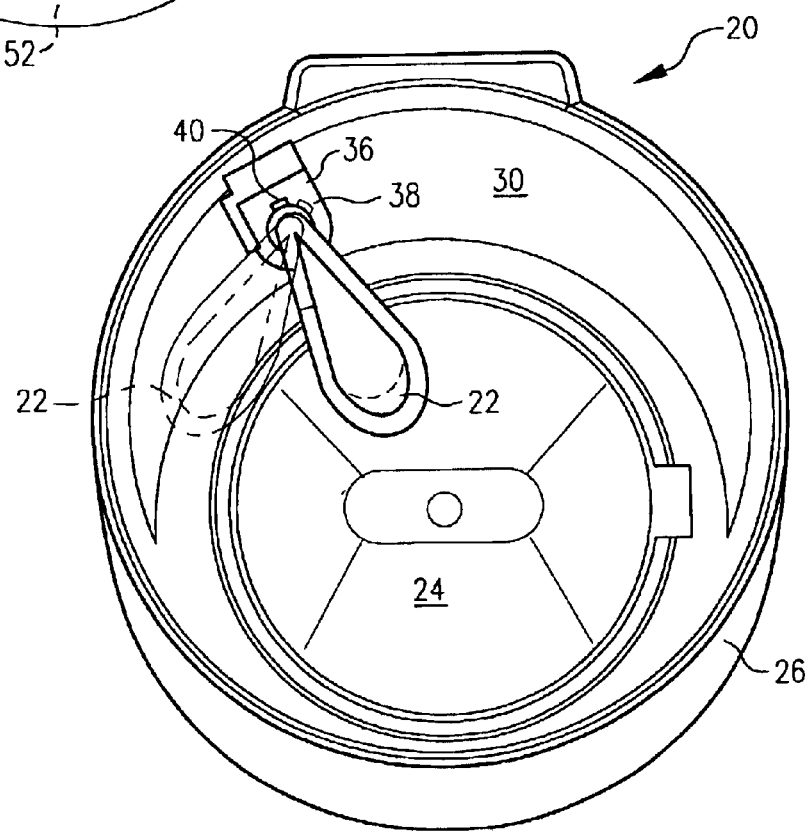
FIG. 2 is a top view of the coffee maker of FIG. 1, showing movements of the horizontal spray shower head in accordance with one aspect of the present invention.

In accordance with one aspect of the present invention, the brew basket 24 is removable so that grinds may be easily removed and replaced. To aid in removing the brew basket 24, in accordance with one aspect of the present invention, the horizontal spray shower head 22 is rotatable to one side so that the brew basket 24 may be lifted upwards without interference. As an example, the horizontal spray shower head 22 may be mounted in a shower head support frame 36 such as is shown in FIG. 2. The shower head support frame 36 includes a hole into which the horizontal spray shower head 22 fits. Two notches 38, 40 are aligned along back edges of the hole. A protrusion 42 (FIG. 4) on the back of the horizontal spray shower head 22 fits into these notches 38, 40 in the over-brew-basket, and out-of-the-way positions, respectively. The out-of-the-way position is shown in phantom in FIG. 2. To move the horizontal spray shower head 22 between these two positions, the user simply lifts the horizontal spray shower head 22 to remove it from the respective notch, rotates the horizontal spray shower head 22, and then lowers the horizontal spray shower head 22 so that the protrusion 42 slides into the other notch.

Figure 3:
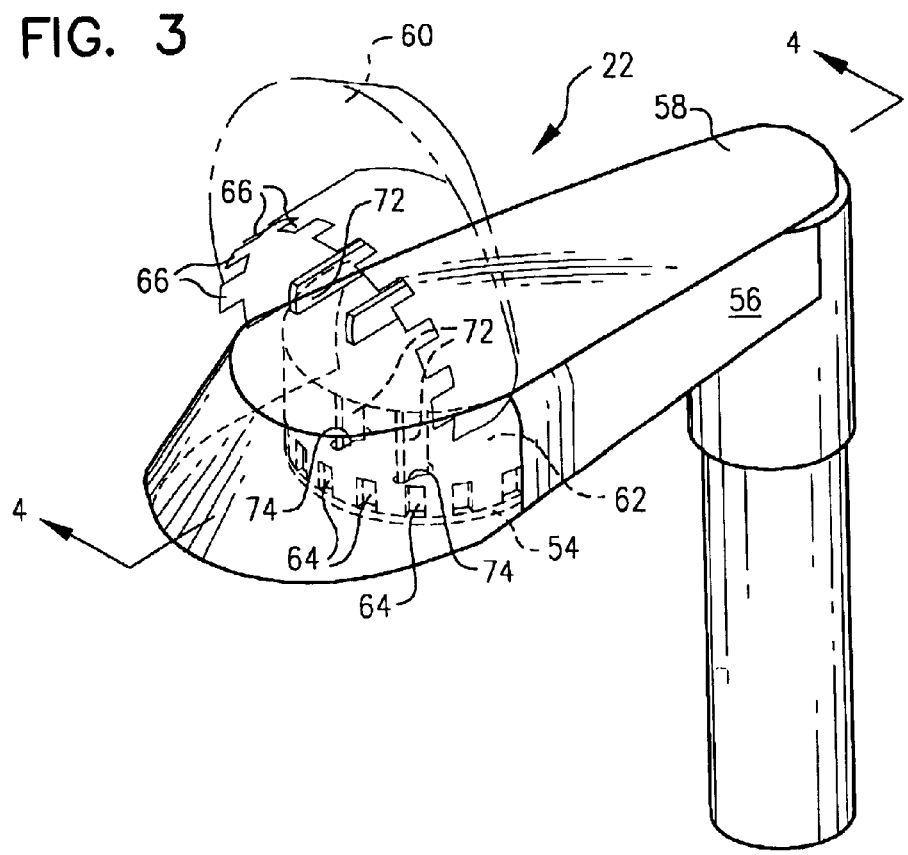
FIG. 3 is a side perspective view of the horizontal spray shower head of FIGS. 1 and 2, with a shroud for the horizontal spray shower head shown raised in phantom.
Figure 6:
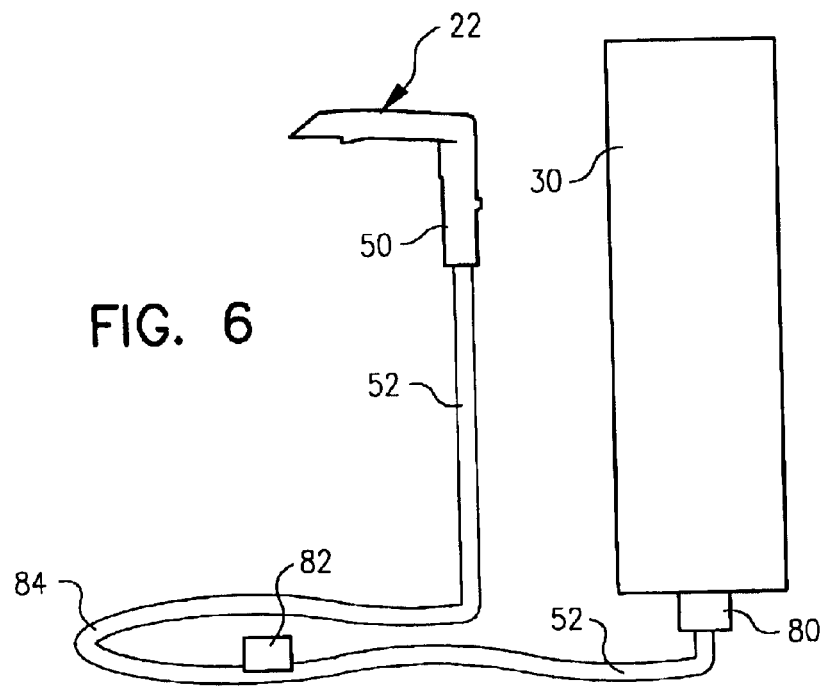
FIG. 6 is a schematic view of the hot water production system for the coffee maker of FIG. 1.
Figure 4:
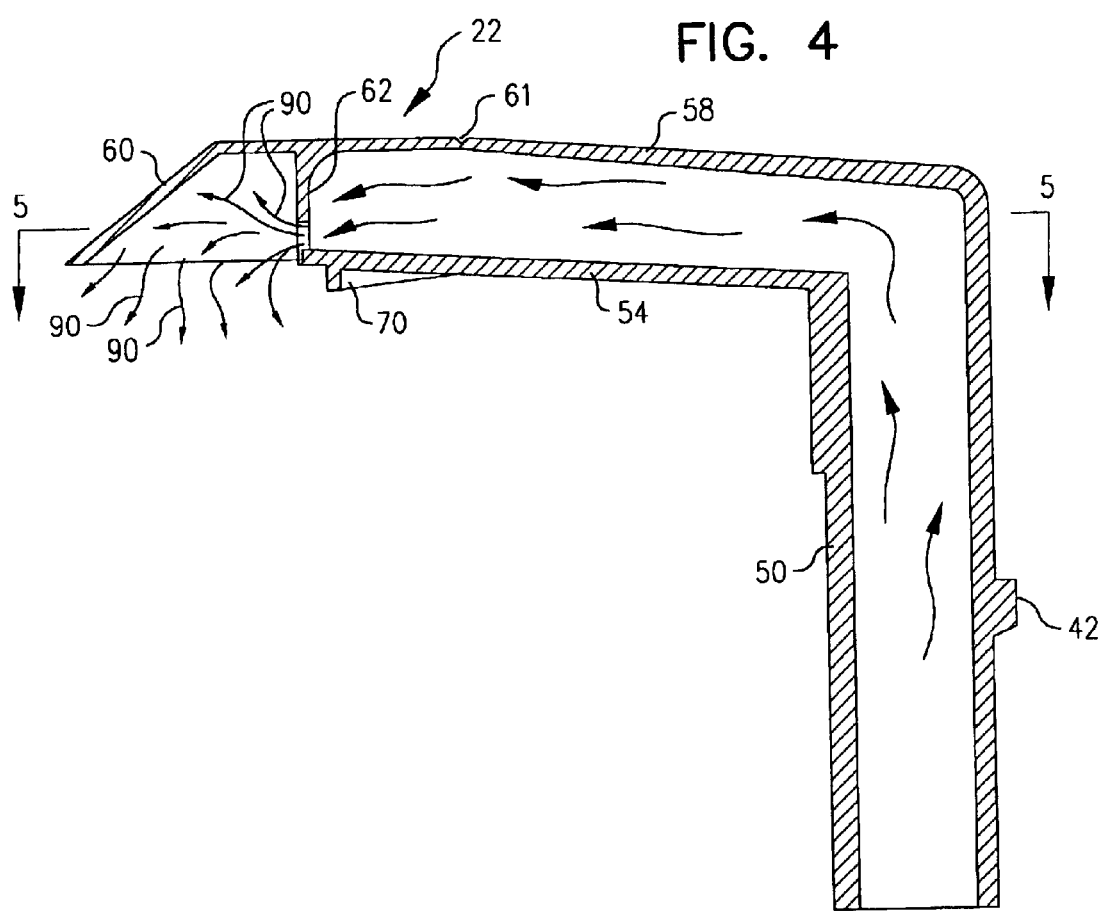
FIG. 4 is a sectional view taken along the section lines 4—4 of FIG. 3.

The structure of the horizontal spray shower head 22 is shown in FIGS. 3 and 4. The horizontal spray shower head 22 includes a neck 50 that extends upward from a tube 52 (FIG. 6). The neck 50 serves as a conduit for heated water coming upward from the tube 52, as is described further below. The neck 50 also fits into the shower head support frame 36, described above. The remainder of the horizontal spray shower head 22 also serves as a conduit for the heated water, bends at approximately a right angle to the neck 50, and includes a lower floor 54, side walls 56, and a top 58.

An overspray guard 60 is hinged from the top 58 at a fold line 61. When in a down position, the overspray guard 60 slopes downward and outward from a convex front face 62 of the horizontal spray shower head 22. The convex front face 62 is arranged vertically at, for example, a 95 degree angle to the lower floor 54. The convex front face 62 includes a series of holes 64 along a lower surface, which may be formed, for example, by gaps between a plurality of protrusions 66 that extend downward from a lower portion of the front face 62. The protrusions 66 can best be seen in FIG. 3.

In the shown embodiment, the front face 62 is attached to the overspray guard 60 and folds upward with the overspray guard 60 when the overspray guard 60 is hinged about the fold line 61. In this upward position, the protrusions 66 stick outward, as is shown in FIG. 3. The protrusions 66 fit against the outer edge of the lower floor 54 when the overspray guard 60 is pressed downward into the closed position.

Hinging of the overspray guard 60 and the front face 62 permits access to an interior portion of the horizontal spray shower head 22 for cleaning. This feature is not necessary for operation of the present invention, but may be provided as a convenience. To hold the overspray guard 60 and the front face 62 in the downward position, a pair of protrusions 72 may be supplied on the bottom of the overspray guard that fit, for example, into a pair of slots 74 (FIG. 3) in the lower floor 54.

The lower floor 54 preferably extends at an angle to horizontal, such as at a five degree slope upward from the neck 50 to the convex front face 62. To provide this slope, in accordance with one aspect of the present invention, the neck 50 extends vertically, and the lower floor 54 is arranged at an angle of ninety-five degrees to the neck. This arrangement provides a five degree slope of the lower floor 54 from the neck 50 to the convex front face 62. The function of the slope of the lower floor 54 is described further below.

A drip guard 70 (FIG. 4) extends just rearward of the front face 62 and underneath the lower floor 54. In accordance with one aspect of the present invention, the front face 62 has a cross section of a semicircle. The drip guard 70 may be similarly contoured, and may be spaced slightly backward from the front face 62.

To brew coffee, the coffee maker 20 is prepared like many conventional coffee makers. For example, a user fills the decanter 34 with water to a desired level, and pours the water from the decanter 34 into the water reservoir 30. Coffee grinds are placed in the brew basket 24, usually in a filter paper or metal filter. The user then closes the reservoir lid 32. The coffee maker 20 is then turned on so as to start the brewing process.

FIG. 6 shows the components that may be used to heat the water and provide the heated water to the horizontal spray shower head 22. When the coffee maker is turned on, the water in the water reservoir 30 travels though a check valve 80 and into the tube 52. A thermostat 82 is located along the tube adjacent to a heater 84. The thermostat 82 cycles on and off to maintain the temperature of water in the tube 52 at a preselected temperature, such as 212 degrees Fahrenheit. The heated water (and steam, if relevant) then passes to the horizontal spray shower head 22. This heating operation is conventional, and the operation and structure of each of the components in FIG. 6, with the exception of the horizontal spray shower head 22, is known in the art of coffee makers.

Water entering the tube 52 is under the pressure of the weight of the water in the reservoir 30 plus atmospheric pressure. When the heater 84 raises the temperature of water in the tube 52, the pressure of that water increases causing the water to flow out of the tube 52 at a higher pressure than it enters the tube 52. This pressure aids in spraying of water from the horizontal spray shower head 22.

Figure 5:
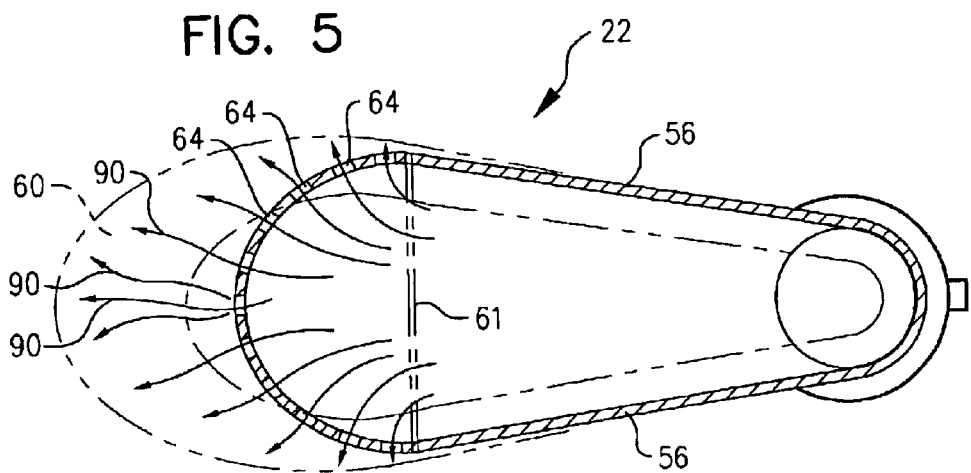
FIG. 5 is a sectional view taken along the section lines 5—5 of FIG. 4.

The water flowing up the tube 52 reaches the lower floor 54 of the horizontal spray shower head 22, where it meets the slope of the floor. The slope of the floor (e.g., five degrees, as discussed above) creates a resistance to a free flow of heated water into the horizontal spray shower head 22. As more water enters the horizontal spray shower head 22, the water level rises until it reaches the holes 64, and the water reaching these holes is at the pressure of the flow of water into the neck. The heated water and steam exits at this pressure, spraying outward from the holes 64 in the lower portion of the convex front face 62. This spraying action is shown by the arrows 90 in FIGS. 4 and 5.

Unlike prior art vertical spray shower heads, the horizontal spray shower head 22 creates less back pressure than conventional vertical spray shower heads while still using a similar neck 50. In the prior art vertical spray shower heads, the back pressure is caused from steam and water that is in the shower head chamber. The backflow of the water and steam happens because the water has to turn downward to find holes to exit the vertical shower heads. Some water and steam, not finding the exit holes, hits the opposite side of the shower head chamber, and then tries to return in the opposite direction. This movement in the opposite direction places backflow pressure on the tube that leads to the heater. To offset this backflow pressure, the thermostat must cycle to maintain appropriate pressure in the shower head. The back pressure and the cycling of the thermostat make the flow rate of water out of the shower head unpredictable.

In contrast, in the present invention, the water flow into the horizontal spray shower head 22 encounters constant resistance as it climbs the slope of the lower floor 54, and then is free to flow or spray out of the holes 64 without back pressure being created. This feature allows the heater 84 to directly control the water flow rate, without concerns for compensation for back pressure. As such, a heating system utilizing the horizontal spray shower head 22 can provide heated water at a more controllable and predictable flow rate. Plus, the thermostat 82 does not have to cycle unnecessarily to maintain the temperature of the heater.

By increasing the wattage of the heater 84, the flow rate of water into and out of the horizontal spray shower head 22 may be increased. An increased flow rate is desirable in brewing coffee, and may be done without backflow worries when using the horizontal spray shower head 22. Moreover, and importantly, increased flow rate may be added to the horizontal spray shower head 22 without increasing the likelihood of the cradle effect. This benefit is due to the fact that the water sprays outward, instead of downward. In prior art vertical spray shower heads, increased flow rate increases the flow rate of water downward, which increases the likelihood of uneven dispersion in the brew basket, usually causing multiple cradles to be formed. In contrast, increased flow rate in the horizontal spray shower head 22 may be used to disperse water coming out of the holes 64 over the brewing basket 24.

Because the flow of water and steam out of the holes 64 of the horizontal spray shower head 22 is in a horizontal direction, the water exiting the holes 64 may lightly drift downward to the coffee grinds. Velocity due to pressure within the horizontal spray shower head 22 is transferred outward, instead of downward. Thus, the water does not hit the coffee grinds with the same pressure as prior art vertical spray shower heads, which allow water to drip or be sprayed downward. In addition, the horizontal jets of water may be arranged, based upon the flow rate of the water through the tube 52 and the arrangement of the holes 64, so that the water flows out of the holes 64 and disperses over as much of the brew basket 24 as possible. In this manner, the coffee grinds at the top layer of the brew basket 24 are exposed to an equal amount of hot water at the beginning of the brewing cycle. The water continues to be added uniformly over the coffee grinds, and trickles down from the top layer at the same rate, providing exposure of a maximum number of the coffee grinds to the heated water. To increase the even extraction of the coffee grinds, the brew basket may be of uniform thickness (i.e., flat on the bottom), so that the amount of flow through all parts of the brew basket is equal.

Because more coffee grinds are exposed to hot water using the horizontal spray shower head 22, the amount of coffee grinds that are needed in a brew cycle are less than in prior art devices. Applicants have found that approximately eighty percent of the regular amount of coffee grinds used in a vertical spray shower head may be used in the horizontal spray shower head 22 to produce the same amount and strength of coffee.

The overspray guard 60 prevents hot water and steam that is exiting the holes 64 from being sprayed over the sides of the brew basket 24. Other safety measures may be utilized in the horizontal spray shower head 22. For example, the drip guard 70 may be used to prevent water rollback from the tip of the horizontal spray shower head 22, and to prevent water from flowing back under the horizontal spray shower head 22.

The horizontal spray shower head 22 shown in the drawings is but one way to provide a horizontal spray of heated water. The horizontal spray shower head 22 may be designed in accordance with the size and configuration of the brew basket 24, the flow rate of water that is desired through the coffee maker 20, and the amount of coffee used in the brew cycle. As one alternative, the horizontal spray shower head may include a single aperture or hole that disperses water over the brew basket. Alternatively, the horizontal spray shower head 22 may be shaped is shown in FIG. 7. In this alternative embodiment, the horizontal spray shower head 122 includes a concave front face 162. The concave front face 162 is particularly useful in dispersing water over an oblong brew basket, such as the cone-type brew basket 124 shown in FIG. 7.

Other arrangements of horizontal spray shower heads may be provided for differently shaped brew baskets. In general, the horizontal spray shower head of the present invention provides one or more hot water outlets (e.g., the holes 64) that dispense hot water at least in some part horizontally into a brew basket. The hot water is provided from a water heating system such as the tube 52 with the heater 84, but other hot water systems may be used, including hot water provided from remote sources, such as hot water tanks.

Preferably, the hot water outlet dispenses the majority, if not all, of the hot water in directions that have a horizontal component. By horizontal, we mean that the direction of water flow or spray is at least in some part directed outward (i.e., at an angle to vertical). Preferably, the water flow or spray direction is more horizontal than vertical (i.e., more water exits at more than 45 degrees to vertical than does at less than 45 degrees to vertical), and more preferably the water flow or spray is mostly horizontal (i.e., water exits at roughly 90 degrees to vertical). It can be understood that the water exiting the horizontal spray shower head 22 at these directions may hit the coffee grinds at a different angle due to gravity, although the flow rate of the water and dispersion of the water is preferably set in order that the water has sufficient velocity to hit the coffee grinds with its momentum still more horizontal than vertical. This feature contributes to the heated water not hitting the coffee grinds under the free fall of gravity.

In summary, the present invention provides a mechanism by which more flavorful coffee may be produced using fewer coffee grinds. In addition, the pressure in the coffee maker 20 is more easily controllable, because there is no back pressure on the thermostat 82 and the heater 84. Less cycling of the thermostat is required because of the lack of back pressure. The horizontal flow of heated water from the horizontal spray shower head 22 does not free fall to the coffee grinds, as occurs in vertical shower heads. Thus, the gravitational pressure exerted by the heated water is much less, avoiding the possibility of the formation of a cradle.

In a preferred embodiment, the heater rating is 945 Watts maximum, and 810 Watts minimum. The flow rate is preferably 5 fluid ounces per minute maximum, and 4 fluid ounces per minute minimum. Other flow rates and heater ratings may be used.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A coffee maker, comprising:
   a brew basket;
   a water heating system;
   a hot water inlet through which heated water flows up from the water heating system;
   a shower head comprising a plurality of hot water outlets arranged on a vertical face of the shower head so that the water exiting the outlet sprays substantially horizontally, the multiple hot water outlets being connected to the water heating system and for spraying heated water received from the water heating system in a direction so that the heated water sprays into the brew basket; and
   a structure comprising a sloped floor of the shower head between the hot water inlet and the hot water outlet that restricts flow to the hot water outlet until heated water reaches the hot water outlets.

2. The coffee maker of claim 1, wherein the plurality of hot water outlets are arranged in a convex arc.

3. A coffee maker, comprising:
   a brew basket;
   a water heating system;
      a shower head having multiple hot water outlets, the multiple hot water outlets being connected to the water heating system and for spraying heated water received from the water heating system in a direction so that the heated water sprays into the brew basket, the direction being at least partly horizontal; and
   a spray guard horizontally spaced outward from the multiple hot water outlets and positioned to block water that sprays from the multiple water outlets from spraying out of the brew basket.

4. The coffee maker of claim 3, wherein the spray guard is mounted on the end of the shower head.

5. The coffee maker of claim 4, wherein the spray guard is hinged to the end of the shower head.

6. A coffee maker, comprising:
   a brew basket;
   a water heating system;
      a shower head;
   at least one hot water outlet positioned in the shower head, and connected to the water heating system and for spraying heated water received from the water heating system in a direction so that the heated water sprays into the brew basket, the direction being at least partly horizontal; and
   a spray guard mounted on the shower head and spaced outward from the hot water outlet and positioned to block water that sprays from the at least one hot water outlet from spraying out of the brew basket.

7. The coffee maker of claim 6, wherein the spray guard is hinged to the end of the shower head.

8. A coffee maker, comprising:
   a brew basket;
   a water heating system;
   a shower head;
   at least one hot water outlet positioned in the shower head, and connected to the water heating system and for spraying heated water received from the water heating system in a direction so that the heated water sprays into the brew basket, the direction being at least partly horizontal; a spray guard spaced outward from the hot water outlet and positioned to block water that sprays from the at least one hot water outlet from spraying out of the brew basket; and
      a drip guard located on a bottom side of the shower head for directing water dripping from the hot water outlet into the brew basket.

9. The coffee maker of claim 8, wherein the spray guard comprises an outwardly and downwardly sloped shield.

10. A coffee maker, comprising:
    a brew basket;
    a water heating system;
       a horizontally extending shower head that extends from a first position outside the brew basket to over the brew basket;
    at least one hot water outlet positioned at a second position over the brew basket, and connected to the water heating system and for spraying heated water received from the water heating system in a direction so that the heated water sprays into the brew basket; and
    a drip guard being located on a bottom surface of the shower head between the first and second positions, the drip guard being located below the outlet for directing water dripping from the hot water outlet into the brew basket.

11. The coffee maker of claim 10, wherein the drip guard comprises a downwardly extending flange.

12. The coffee maker of claim 10, further comprising a plurality of hot water outlets at the second position, and wherein the plurality of hot water outlets are arranged on a convex face of the hot shower head, and wherein the drip guard is configured as a convex flange extending downward from the shower head.

* * * * *